Patented Sept. 15, 1931

1,823,131

UNITED STATES PATENT OFFICE

JAMES B. CROCKETT, OF CAMBRIDGE, MASSACHUSETTS, ASSIGNOR TO CAMBRIDGE RUBBER COMPANY, OF CAMBRIDGE, MASSACHUSETTS, A CORPORATION OF MASSACHUSETTS

FLOOR COVERING AND METHOD OF MAKING SAME

No Drawing. Application filed June 28, 1927. Serial No. 202,160.

This invention relates to improved rugs, mats and carpets treated to prevent slipping on hard wood, waxed or polished floors or other polished surfaces.

Heretofore rugs and other floor coverings have been treated with preparations containing rubber to prevent slipping on polished floors. These preparations have been of rubber dissolved in an organic solvent. The floor coverings treated with such material, while capable of use and functioning to some extent in the intended purpose, are objectionable on account of extreme stickiness or tackiness which interferes with the rolling of the coverings upon themselves or the piling of them for shipment, storage or display. Also the ageing quality of the preparation is not high.

It is an object of this invention to provide a floor covering with a non-slip backing which shall be durable, flexible, efficient in operation, and which without having extreme tackiness shall nevertheless have a high degree of surface friction.

Another object is to provide a flexible non-slip backing as an integral part of the body of the rug, mat or carpet which does not injure or deface the body, and which may be applied in such a manner as not to permit the backing material to penetrate to the face of the rug, mat or carpet.

To attain these objects I employ as a backing material rubber latex in the form either natural, vulcanized or concentrated, and with or without the fillers, preservatives, coloring matter or antiseptics hereinafter described.

Generally speaking, the objects of the invention may be accomplished by coating the back or under-side of the floor covering with a suspension of rubber in water such as rubber latex which is a natural colloidal suspension or dispersion of rubber in water, combined with a small percentage of resins, proteins, sugars, etc. as obtained from the rubber tree *Hevea-brasileinsis*. When this coating is applied by any convenient method to the under-side of the floor covering and the water content removed by evaporation, drying or coagulation, a thin latex rubber film is left on the under-side of the covering, adhering firmly to it, and effectively preventing the covering from slipping. Although it is preferred to apply the latex in a form having a rubber content of not less than 8% nor more than 38%, it is to be understood that the invention is not limited to these proportions and that more concentrate or more dilute form may be used. Also, any aqueous dispersion of rubber, such as artificially prepared latex, may be employed and there may be admixed with either phase of such suspension, other materials, either liquid or solid, for the purpose of suitably modifying the character of either the liquid, or the subsequently coagulated or dried rubber. There may be used also a latex paste produced by treating natural latex with a protective colloid and partly removing the water content by evaporation to a point beyond which coagulation would ordinarily occur. Such latex paste may be obtained having a rubber content as high as 80% and may be used in this form or may be diluted by adding water until any percentage of rubber content is obtained. Further, latex from which a large proportion of all of the water soluble and non-rubber constituents have been removed, for instance, as obtained by centrifuging may be used in any desirable concentration. The rubber content of the latex may be vulcanized while in suspension by known methods, so that a vulcanized or partly vulcanized dried film is formed when the water content is removed. Such a suspension is referred to in the claims as "vulcanized rubber latex."

The latex may be preserved by any of the usual preservatives, such as an alkali, for example, ammonia, or an organic basic substance or an alkaline phosphate combined with an organic antiseptic such as formaldehyde, and with or without the addition of protective colloids, such as albumen, gelatine, casein, saponin, etc. and with or without any of the substances known in the rubber industry which retard oxidation of the deposited rubber. Filling materials may also be added such as whiting, clays, magnesium carbonate, barytes, or adhesive or resinous substances such as rosin, gums, bitumen, coal tar resins, glue, shellac, etc., and, if desired, the film may be colored by the addition to the latex of dyes or pigments.

If desired, a substance may also be added to the latex having antiseptic or insect repelling properties. The addition of such ingredient may be desirable in the case of floor covering exposed to vermin, moths and other insects and such ingredients as essential or synthetic oils, such as oil of camphor, citronella, terpineol, or a coal tar oil such as cresol, if added to the latex in small proportions, will remain on or in the dried film upon the covering and furnish a measure of protection.

In the manufacture of floor coverings which are sized, the rubber latex is most conveniently and effectively applied after the covering has been sized with any of the usual materials in any of the usual methods. Such sizing materials are usually a mixture of starch, glue, or gum, which are generally applied and forced into the rug or carpet by pressure rolls carrying the sizing material, after which the carpet, rug or mat is dried by passing through a drying oven or over drying cans. The rubber latex may be conveniently applied as the carpet leaves the dryer and the water content may then be removed by evaporation, such as, for instance, drying at ordinary room temperatures or by again passing through the dryer or into another dryer as may be convenient.

The suspension of rubber in its aqueous medium may be applied in any convenient manner, such as brushing, spreading, spraying or by a roll, which will dip into and apply a thin coat of the latex to the bottom of the carpet or floor covering as same is drawn over the roll. In treating large carpets or rugs, it is often only desirable to apply the latex to the edges, corners, or part of the under surface. When using natural rubber latex, the thin film deposited, after the water content is removed, is practically colorless, invisible and odorless.

It may be desirable in some cases to vulcanize the rubber latex film subsequently and in such cases, it is convenient to add the vulcanizing ingredients with or without any of the well-known accelerators to the rubber latex. Such ingredients may be added in proportions to effect vulcanization during drying or within a short time thereafter, at ordinary room temperatures, or by the application of heat. If the floor covering is dried by passing through a heater or dryer it is convenient in some cases to effect vulcanization during this process. The film may, of course, be partially or wholly vulcanized by other known methods such as by the application of sulphur chloride dissolved in a solvent or employed in a vaporous form or by exposing the rubber film alternatively to gaseous sulphur dioxide and hydrogen sulphide according to a well-known method.

It is only necessary to partly or wholly coat the under surface of the carpet, rug or mat and it is not necessary to penetrate the fibrous material to accomplish the purpose desired. The main object is to adhere and attach to the bottom of the covering a dried rubber latex film which will prevent the covering from slipping and which is not noticeable and does not deface or mar it by reason of its application. It is not a purpose of this invention to bind the fibres of the floor covering together or to assist in the construction or forming of the sheet by holding or adhering the materials composing it together or to increase their strength, but merely to provide a thin friction film on the back of the covering which shall be inexpensive, flexible, practically invisible and which will prevent the covering from slipping on polished surfaces.

The invention is particularly applicable to floor covering such as Axminster, Wilton, Brussels, Oriental, Wool Back and other types of covering having a warp back, although it may also be applied with good results to felt, woven grass, rag or paper mats.

Having described the invention what is claimed as new is:—

1. A floor covering rug, carpet or the like, in which there is a sizing coat of material adapted to fill the interstices at the back, and a film of dried rubber latex over the sizing and not extending to the front or face of the floor covering.

2. A floor covering rug, carpet or the like, having a sizing coat of material adapted to fill the interstices at the back and a deposited vulcanized rubber latex dried to a friction film of vulcanized rubber over said sizing coat.

JAMES B. CROCKETT.